US008139610B1

(12) United States Patent
Gulstone (10) Patent No.: US 8,139,610 B1
(45) Date of Patent: Mar. 20, 2012

(54) METHOD FOR FRAMING DATA FOR TRANSMISSION OVER AN ENCODED CHANNEL

(75) Inventor: Nigel A. Gulstone, Santa Clara, CA (US)

(73) Assignee: Xilinx, Inc., San Jose, CA (US)

( * ) Notice: Subject to any disclaimer, the term of this patent is extended or adjusted under 35 U.S.C. 154(b) by 1024 days.

(21) Appl. No.: 11/334,134

(22) Filed: Jan. 17, 2006

(51) Int. Cl.
*H04J 3/00* (2006.01)
(52) U.S. Cl. .......................................................... 370/476
(58) Field of Classification Search .................. 370/474, 370/535, 476; 714/758; 360/48
See application file for complete search history.

(56) References Cited

U.S. PATENT DOCUMENTS

| | | | | |
|---|---|---|---|---|
| 5,200,864 A | * | 4/1993 | Dunn et al. | 360/48 |
| 5,734,826 A | * | 3/1998 | Olnowich et al. | 709/238 |
| 6,600,746 B1 | * | 7/2003 | Petersen | 370/394 |
| 7,233,948 B1 | * | 6/2007 | Shamoon et al. | 707/9 |
| 7,251,699 B1 | * | 7/2007 | Lo | 709/250 |
| 7,286,566 B1 | * | 10/2007 | Parruck et al. | 370/474 |
| 7,443,814 B2 | * | 10/2008 | Agarwal et al. | 370/316 |
| 2002/0122503 A1 | * | 9/2002 | Agazzi | 375/316 |
| 2003/0237041 A1 | * | 12/2003 | Cole et al. | 714/776 |
| 2005/0102497 A1 | * | 5/2005 | Buer | 713/150 |

OTHER PUBLICATIONS

IEEE Computer Society, "Part 3: Carrier Sense Multiple Access With Collision Detection (CSMA/CD) Access Method and Physical Layer Specifications", 802.3ae, IEEE Standards, Aug. 30, 2002, pp. 1-516, In specific clause 49 pp. 317-359.*
Xilinx, Inc., "Aurora", Xilinx Protocol Specification, Dec. 16, 2005, pp. 1-3, Available from Xilinx, Inc., 2100 Logic Drive, San Jose, CA 95124.
IEEE Computer Society, "Part 3: Carrier Sense Multiple Access With Collision Detection (CSMA/CD) Access Method and Physical Layer Specifications", 802.3ae, IEEE Standards, Aug. 30, 2002, pp. 1-516, Available from IEEE, 3 Park Avenue, New York, NY 10016-5997.

* cited by examiner

*Primary Examiner* — Derrick Ferris
*Assistant Examiner* — Gbemileke Onamuti
(74) *Attorney, Agent, or Firm* — Thomas A Ward; John J. King (57) ABSTRACT

A serializer is provided to serialize combined synchronization information and data blocks for transmission over the high-speed channel. A gearbox combines synchronization information with data blocks to present to the serializer. A scrambler scrambles data blocks to present to the gearbox. An encoding device stores a program that contains instructions to format the data blocks for sending over the high-speed channel. The formatting reduces a number of operations used to receive the data blocks by a receiver.

19 Claims, 7 Drawing Sheets

| FRAME DATA N+7 | FRAME DATA N+6 | FRAME DATA N+5 | FRAME DATA N+4 | FRAME DATA N+3 | FRAME DATA N+2 | FRAME DATA N+1 | FRAME DATA N |
|---|---|---|---|---|---|---|---|

FIG. 4A

| SEPARATOR BTF | VALID OCTET COUNT | FRAME DATA N+5 | FRAME DATA N+4 | FRAME DATA N+3 | FRAME DATA N+2 | FRAME DATA N+1 | FRAME DATA N |
|---|---|---|---|---|---|---|---|

FIG. 4B

| SEPARATOR-7 BTF | FRAME DATA N+6 | FRAME DATA N+5 | FRAME DATA N+4 | FRAME DATA N+3 | FRAME DATA N+2 | FRAME DATA N+1 | FRAME DATA N |
|---|---|---|---|---|---|---|---|

| |
|---|
| IDLE |
| 07,06,05,04,03,02,01,00 |
| IDLE |
| SEP,2,--,--,--,--,09,08 |
| IDLE |
| 17,16,15,14,13,12,11,10 |
| 1F,1E,1D,1C,1B,1A,19,18 |
| SEP,0,--,--,--,--,--,-- |
| SEP-7,25,24,23,22,21,20 |
| SEP,1,--,--,--,--,--,30 |

Lane 0

FIG. 5B

| | |
|---|---|
| IDLE | IDLE |
| 07,06,05,04,03,02,01,00 | SEP,2,--,--,--,--,09,08 |
| IDLE | IDLE |
| 17,16,15,14,13,12,11,10 | 1F,1E,1D,1C,1B,1A,19,18 |
| SEP,0,--,--,--,--,--,-- | SEP-7,25,24,23,22,21,20 |
| SEP,1,--,--,--,--,--,30 | IDLE |

Lane 0      Lane 1

| UFC BTF | UFC COUNT | --- | --- | --- | --- | --- | --- |

FIG. 6A

| MESSAGE DATA N+7 | MESSAGE DATA N+6 | MESSAGE DATA N+5 | MESSAGE DATA N+4 | MESSAGE DATA N+3 | MESSAGE DATA N+2 | MESSAGE DATA N+1 | MESSAGE DATA N |

| IDLE |
|---|
| UFC(10) |
| 07,06,05,04,03,02,01,00 |
| --,--,--,--,--,--,09,08 |
| IDLE |
| FRAME DATA |
| UFC(3) |
| IDLE |
| --,--,--,--,--,02,01,00 |
| IDLE |

Lane 0

FIG. 7B

| Lane 0 | Lane 1 |
|---|---|
| IDLE | UFC(10) |
| 07,06,05,04,03,02,01,00 | --,--,--,--,--,--,09,08 |
| IDLE | FRAME DATA |
| UFC(3) | IDLE |
| --,--,--,--,--,02,01,00 | IDLE |

METHOD FOR FRAMING DATA FOR TRANSMISSION OVER AN ENCODED CHANNEL

FIELD OF INVENTION

Embodiments of the present invention relate to high-speed serial links, and more particularly to framing data for transmission over an encoded channel.

BACKGROUND

Many data processing systems include an encoded channel that is made up of electronic components that enable components, such as processor(s), memory(ies) and the like, to exchange information at relatively high data rates. Typically, an encoded channel will be exchange data according to a protocol. The protocol specifies how the data is to be encoded. One such communications protocol facilitates high-speed serial communication across serial links. Its four main advantages over other protocols are its low resource requirements (leading to inexpensive implementations in digital hardware), its scalability (the protocol runs at many different speeds and can accommodate the use of multiple transceivers), its efficiency (the protocol does not consume a lot of bandwidth for control overhead), and its flexibility. Encoding is important because it imparts on the data properties that make it easier to recover by the receiving component. Such data properties include finding byte boundaries in a serial stream, preventing data dependant jitter, and minimizing the generation of strong electric fields at specific frequencies.

In advanced systems, the amount of data being exchanged is large. In some situations, it may be very difficult to exchange information using a protocol economically, due in part to high resource costs. The bulk of the cost of implementing conventional protocols is due to byte shifting and byte storage operations and the quantity of framing characters required by the protocol.

Consequently, there is a need for new techniques for encoding data for transmission over high-speed channels.

SUMMARY

Embodiments of the present invention include a system for encoding data for transmission over a high-speed channel. The system includes a serializer to serialize combined synchronization information and data blocks for transmission over the high-speed channel. A gearbox combines synchronization information with data blocks to present to the serializer. A scrambler scrambles data blocks to present to the gearbox. An encoding device stores a program that contains instructions to format the data blocks for sending over the high-speed channel. The formatting reduces a number of operations used to receive the data blocks by a receiver.

In some embodiments of the present invention, the encoding device stores a program that contains instructions to transpose an order of data bytes received from a sending user application prior to presenting the data bytes as data blocks to the scrambler. Transposing the order of data bytes enables data bytes to be recovered by a receiver free of performing shift operations to recover the data bytes.

In some embodiments of the present invention the encoding device stores a program that contains instructions to insert a separator indicating a frame boundary into data bytes received from a sending user application to present data blocks to the scrambler. Inserting a separator indicating a frame boundary of data bytes enables a receiver to detect a frame boundary free of data frame encapsulation by a pair of begin frame and end frame markers.

In some embodiments of the present invention, the encoding device stores a program that contains instructions to format user flow control data bytes received from a sending user application to present a user flow control header block followed by separate user flow control data blocks to the scrambler. Separating user flow control data bytes into separate blocks enables user format data to be recovered by a receiver free of performing shift operations to recover the user flow control format data bytes.

BRIEF DESCRIPTION OF THE DRAWINGS

Further details of embodiments of the present invention are explained with the help of the attached drawings in which.

DETAILED DESCRIPTION

Figure 1:
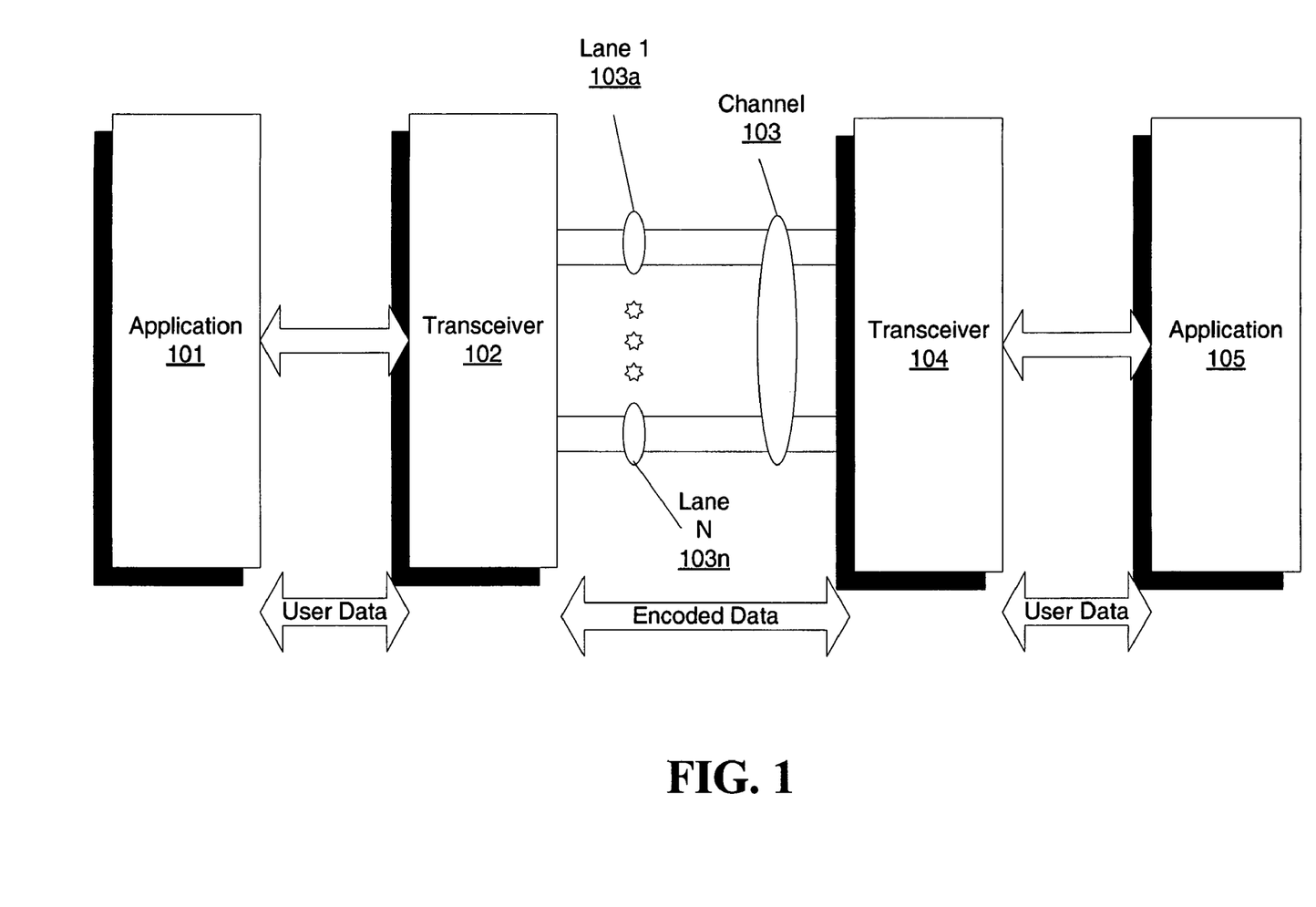
FIG. 1 is a block diagram showing a system in which embodiments of the present invention may be used.

FIG. 1 is a block diagram showing a system 100 in which embodiments of the present invention can be used. System 100 includes user applications 101, 105, which exchange user data in communication with one another via a serial data transfer mechanism. The serial data transfer mechanism includes a first transceiver 102 communicatively coupled with a second transceiver 104 by a channel 103. The channel 103 includes one or more lanes, such as lane 103a and 103n shown in FIG. 1. Each of lanes 103a-103n is a serial data connection that can be used in full-duplex or simplex modes of operation. The transceiver pair 102, 104 exchanges user data on behalf of user applications 101, 105 encoded according to a protocol. The protocol specifies that 64 bits of data are packed into 66 bit blocks for transmission, and is thus named a 64/66 protocol. While the system 100 can achieve high-speed data transfer between the user applications in either simplex or duplex modes, for simplicity embodiments of the present invention will be described with reference to the simplex mode of operation as illustrated by FIG. 2.

Figure 2:
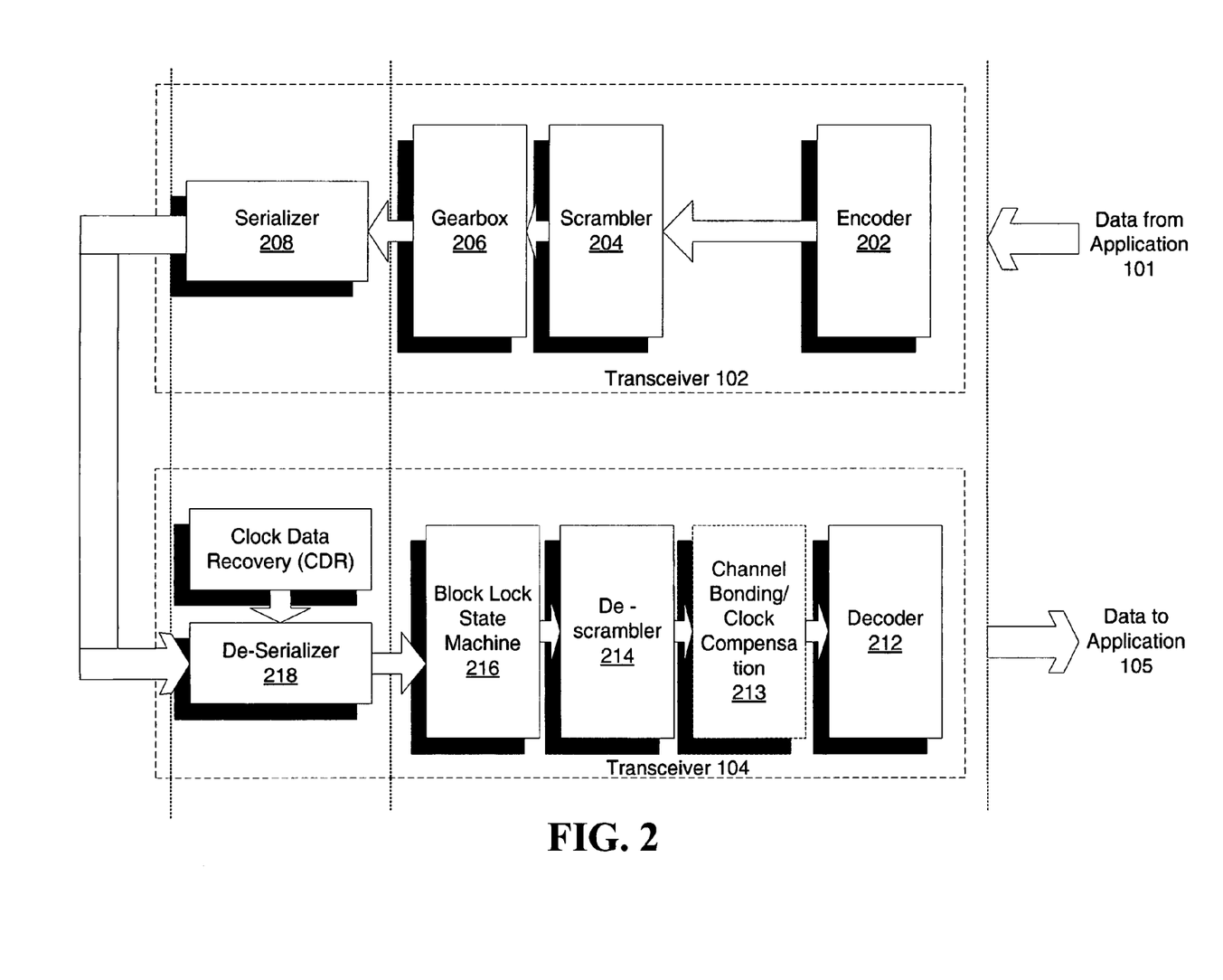
FIG. 2 is a block diagram showing a simplex mode data transfer between transceivers in an embodiment of the present invention.

FIG. 2 is a block diagram showing a simplex mode data transfer between transceivers according to embodiments of the present invention. As shown in FIG. 2, transceiver 102 is transmitting information over a serial data transfer link to transceiver 104. Transceivers 102 and 104 include encoders/decoders 202 and 212 that specify how data and control information are to be encoded before transmission through the serial channel, and decoded upon reception. In one embodiment, encoding operations are performed in a field programmable gate array (FPGA) that is not integral to the transceiver. Scramblers/descramblers 204 and 214 specify how data and control information are scrambled before transmission and de-scrambled after reception. Gearboxes 206 and 216 specify how 64 bit blocks are transformed to 66 bit blocks for transmission and how 66 bit blocks are transformed to 64 bit blocks upon reception. Channel bonding/clock compensator 213 provides initialization of the communications path between transceivers 102 and 104 and compensation for small differences between the reference clocks on each side of the channel. Each of the transceiver components will be described in further detail with reference to an example embodiment.

1. Encoding

The data and control information is encoded in 64-bit "Block Codes." Each 64-bit block code is then marked with a sync header value, indicating for example whether it is a data block or a control block. There may be 15 types of control blocks available. Of these 15, 6 may be permanently assigned specific functions in the protocol, and 9 may be assigned any meaning by a higher-level application.

2. Scrambling

Whenever a lane transmits a block code, the scrambler 204 scrambles the 8 octets to the right of the 2-bit sync header using a self-synchronizing scrambler, for example with the polynomial $1+X^{39}+X^{58}$. The 2-bit sync header is never scrambled. When a block code is received, the 8 octets to the right of the 2-bit sync header are de-scrambled using a self-synchronizing de-scrambler 214 with the same polynomial, e.g., $1+X^{39}+X^{58}$. The 2-bit sync header is never de-scrambled.

3. Gearbox

When transmitting block codes, the gearbox 206 combines the sync header with a 64-bit block from the scrambler to present a 66-bit block code to the serializer 208. When receiving block codes, the gearbox 216 separates the 66-bit block from the de-serializer 218 into a 2-bit sync header and a 64-bit block for de-scrambling.

4. Channel Bonding

Channel bonding/clock compensation 213 performs channel bonding by buffering incoming data, recognizing channel bonding blocks, and communicating with other lanes to adjust the incoming data streams in each lane so that the channel bonding blocks are presented at the output of the transceiver 104 from all the lanes simultaneously. The depth of the buffer used by the channel bonding/clock compensator 213 determines the maximum skew that can be supported.

5. Clock Compensation

Channel bonding/clock compensator 213 can use clock compensation blocks to allow separate reference clocks to be used to drive the interfaces on each side of a channel 103. Without clock compensation, full duplex interfaces would need to share a reference clock, and simplex receivers would need to use the clock recovered from the incoming data. If the channel does not use a shared clock, clock compensation blocks may be transmitted in a certain pattern or interval, such as for 3 consecutive cycles on every lane in the channel at least once every 10000 cycles.

Lanes performing clock compensation employ elastic buffers to move data from the recovered clock domain to their local clock domain. If a clock compensation block arrives when the elastic buffer is almost full, it should not be written to the buffer. If the lane reads a clock compensation block from the buffer while the buffer is almost empty, it should not increment its read address so the block will be read again. This process prevents buffer overflow or underflow and allows asynchronous operation. Clock compensation blocks are treated as idles in all other parts of the receiver.

Figure 3A:
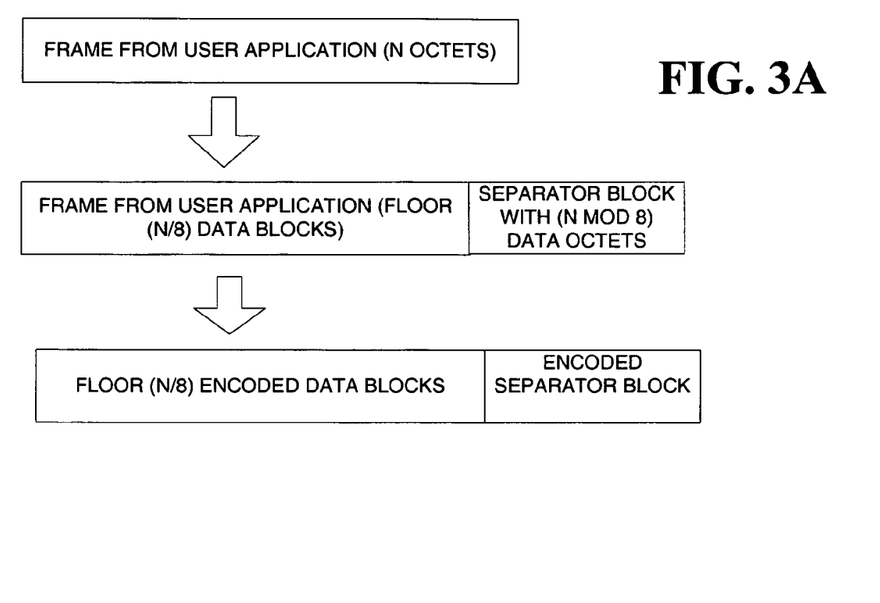
FIGS. 3A-3B show an example of frame transmission and reception in the transceivers of the system in FIG. 2.
Figure 3B:
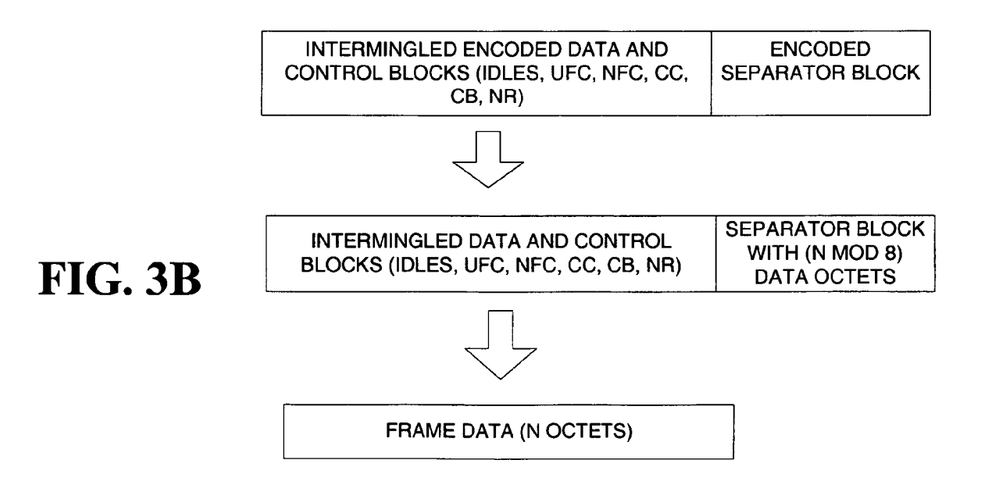

In conjunction with the transceivers described above with reference to FIG. 2, one embodiment specifies delineation and separation operations as shown in FIGS. 3A-3B. These figures show processes for transmitting and receiving information on channel 103. Note that not all possible formats are shown in the figures. Only those that are used for illustration are shown.

FIG. 3A illustrates how frames are mapped to block codes in an embodiment of the present invention. Transceiver 102 performs the following procedure to transmit a frame from the user application 101 through an initialized channel 103: frame delineation using separator and separator-7 blocks; encoding of blocks; and serialization and clock encoding. As shown in FIG. 3A, the end of every frame from the user application is delineated in the channel using a separator or separator-7 block. This allows a channel partner to distinguish data from different frames. In an embodiment, the frame may be cut into 8-octet chunks to fit into data blocks. Any remaining octets at the end of the frame are transmitted in the data section of the separator block. If the number of remaining octets is 6 or less, a separator block is used. If 7 octets remain, a separator-7 block is used. It is noteworthy that the transceiver 102, 104 may choose to send a higher priority block at any time during the frame. Idle blocks can also be intermingled with data and separator blocks at any time. After the frame has undergone link layer frame delineation, the data blocks and separator that make up the frame are coded by the encoder 202, scrambler 204 and gearbox 206 prior to transmission. After the blocks that make up the frame have undergone all encoding, the blocks are serialized for transmission.

FIG. 3B illustrates how information is received according to embodiments of the present invention. Transceiver 104 performs the following procedure to receive a frame from an initialized channel 103 and pass it to a user application 105: de-serialization; decoding of all blocks; and control block stripping. As shown in FIG. 3B, the serial data stream is received. The receive logic de-serializes this data to recover 66-bit encoded block codes. After de-serialization, the incoming encoded 66-bit blocks are decoded into 64 bit blocks. Data and separator blocks from the channel 103 can be intermingled with Control blocks, such as clock compensation, channel bonding, flow control, User K-blocks and Idles. All of these blocks are separated from the frame data to be handled. Only the data octets from the data blocks and the separator block are delivered to the user application 105 as a frame.

User flow control messages also use data blocks to transfer message data. When part of a data block is used for user flow control message octets, none of the octets in that block are used to carry data octets. User flow control is discussed in more detail below with reference to FIGS. 6A-6B. "Not Ready" blocks reset frames. If a Not Ready block is received, the frame in progress is considered lost. A new frame starts after the Not Ready block.

Figure 4A:
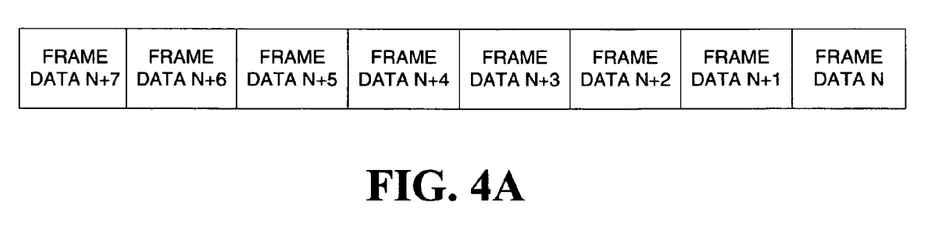
FIGS. 4A-4C show an example of data and separator blocks of an embodiment of the present invention.
Figure 4B:
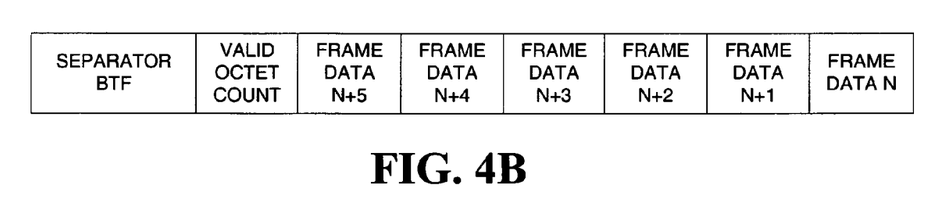
Figure 4C:
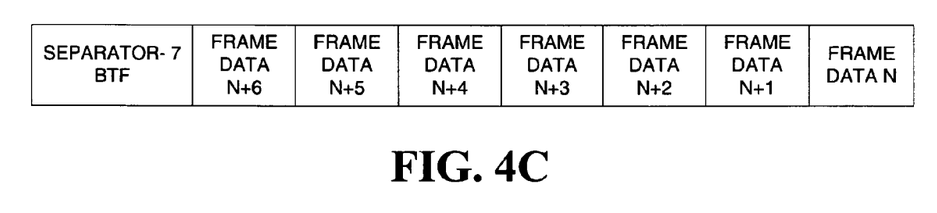

In conjunction with the transceivers described above with reference to FIG. 2, one embodiment specifies data and separator blocks as shown in FIGS. 4A-4C. These three figures show the correspondence between data blocks, separator blocks and separator-7 blocks in an embodiment. Note that not all possible formats are shown in the figures. Only those that are used for illustration are shown.

FIG. 4A shows the format of a data block used to carry frame data. Data blocks are filled starting from the least significant octet and the data in the block are contiguous. Data blocks used for frame data are filled completely.

FIG. 4B shows the format of a separator block. The two most significant octets of the block are used for control information; the remaining blocks can be used for frame data.

Frame data is added to the block starting from the least significant octet, and the data in the block is contiguous. Separator blocks can be partially filled. Unused octets are considered don't care octets in the current frame. The 8-bit valid octet count field indicates how many of the remaining octets in the separator block carry frame data. The block can carry 0 to 6 frame data octets.

FIG. 4C shows the format of a separator-7 block. The most significant octet of the block is used for control information; the remaining blocks are used for frame data. Frame data is added to the block starting from the least significant octet, and the data in the block are contiguous. All 7 data octets of the separator-7 block are filled with frame data.

Figure 5A:
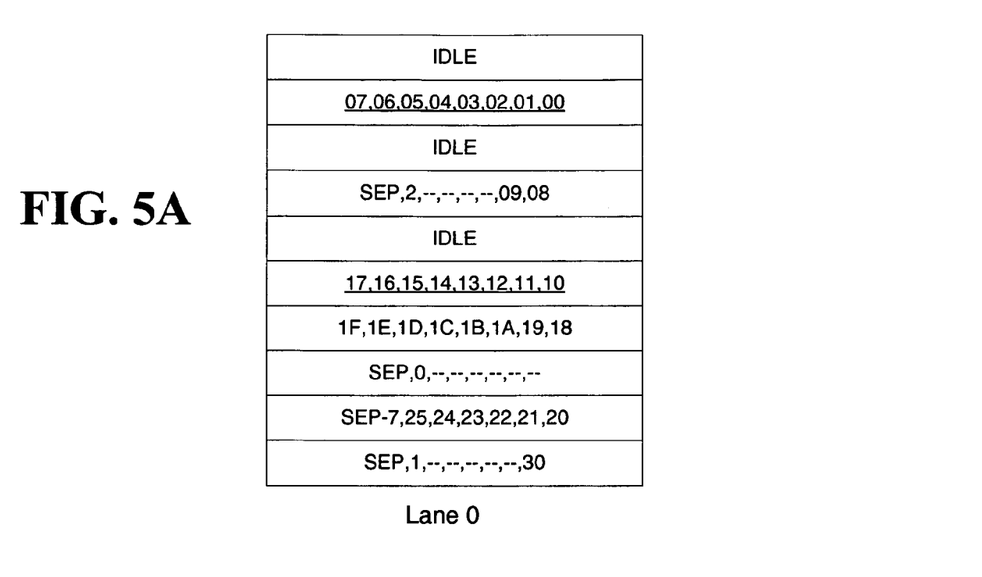
FIGS. 5A-5B show an example of frame data transfer through a single lane and a multilane channel in an embodiment of the present invention.
Figure 5B:
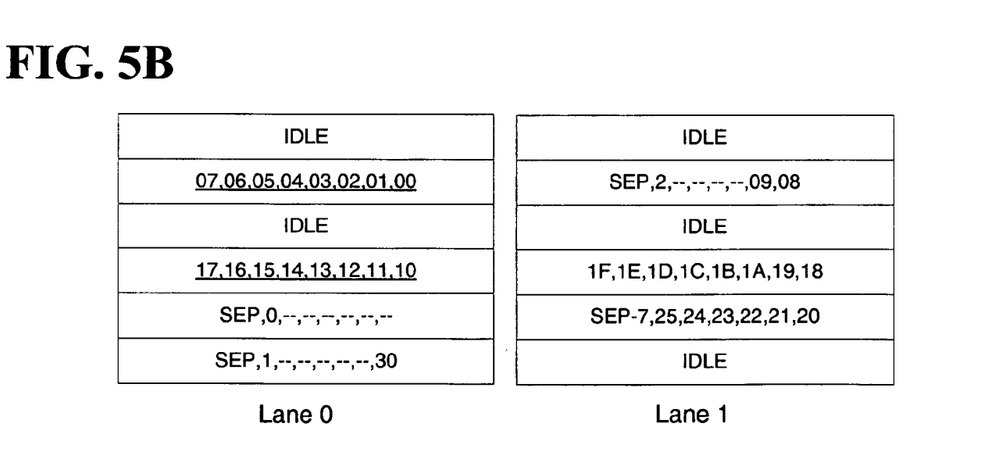

FIGS. 5A-5B show examples of frame data transfer through a single lane and a multilane channel. Each frame transferred carries a series of incrementing octets. Note that frames can be interrupted by Idles, and can be back to back. Also note how separator blocks by themselves can be used to end frames that are divisible by 8, or carry all the data for frames 7 octets or smaller.

Embodiments may use two forms of flow control, called "Native Flow Control" and "User Flow Control." Native flow control employs a control block code to carry requests for flow control, and a PAUSE value. User flow control uses a control block as a header for a message that can consist of up to 256 bytes of data. Since native flow control is self-contained, this type of flow control requires no special rules to prevent byte shifting. User flow control, on the other hand, employs message data, which is most economically provided though the same data bus that provides regular data.

Figure 6A:
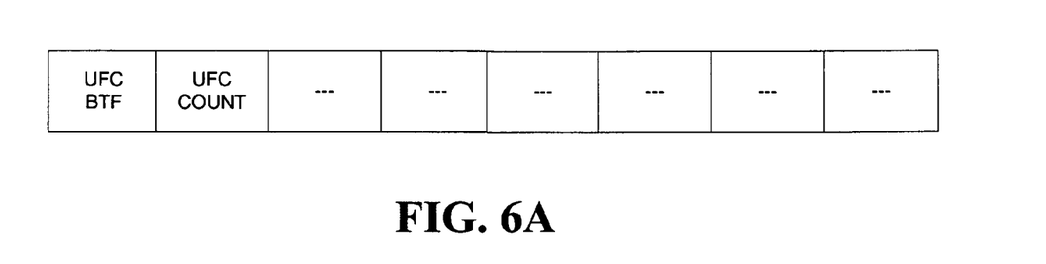
FIGS. 6A-6B show an example of user flow control of an embodiment of the present invention.
Figure 6B:
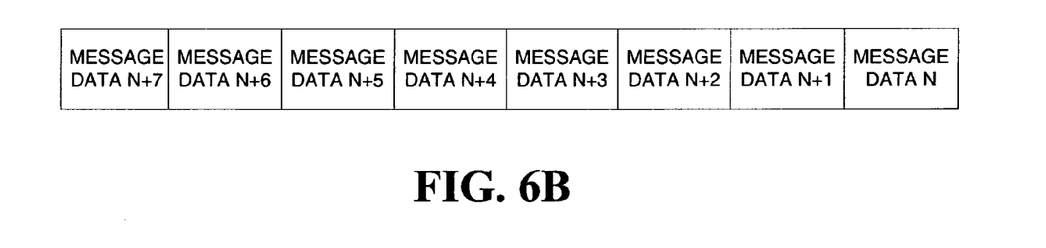
Figure 7A:
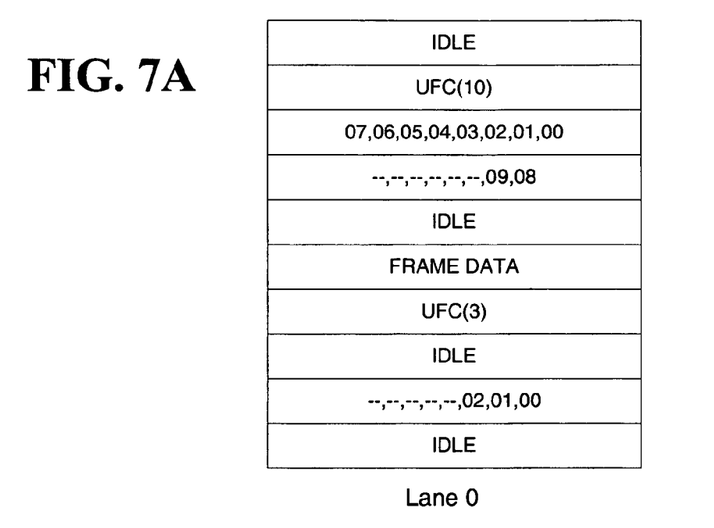
FIGS. 7A-7B show an example of user flow control messages through a single lane and a multilane channel in an embodiment of the present invention.
Figure 7B:
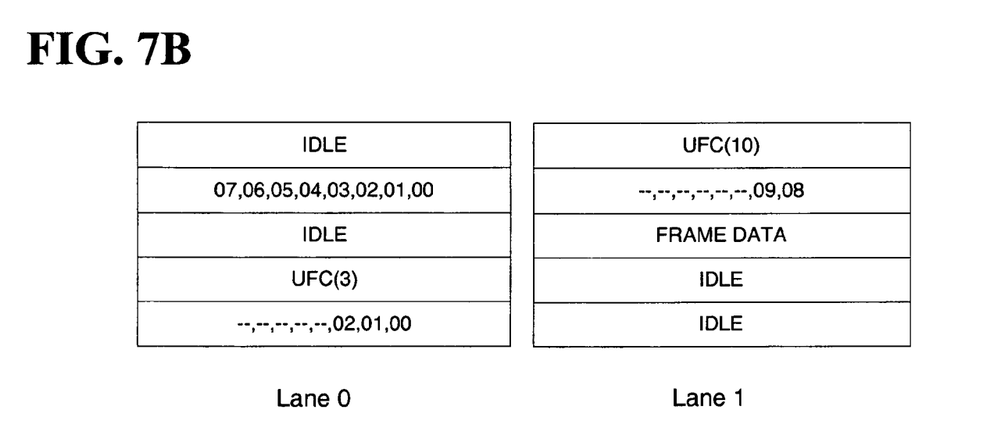

FIGS. 6A-6B show an example of user flow control. User flow control messages are different from regular data because they are preceded by a header instead of followed by a separator. To reduce the number of operations, the user flow control header is defined as a control block code carrying only UFC header information, no data, as illustrated by the UFC block depicted in FIG. 6A. The data blocks that follow the header carry UFC data in UFC data blocks having the format illustrated by FIG. 6B, until enough blocks have been transferred to carry all the data promised by the UFC header. The UFC message data uses the same byte twist as regular data, so no multiplexers are required to change the data format. FIGS. 7A-7B show an example of user flow control messages through a single lane and a multilane channel in an embodiment of the present invention.

Embodiments of the present invention also apply to multilane channels. The protocol defines two levels of compliance for multilane channels to accommodate a tradeoff inherent in the design of multilane 64B/66B channels. The tradeoff is as follows: to obtain greater bandwidth efficiency, the data path circuit ideally is able to end and start a new frame on the same clock cycle on both the transmit and receive side of the channel. This logic can be expensive because of the inherent need to shift and store data. On the other hand, to obtain greater resource efficiency, byte shifting and byte storage are ideally reduced on both the transmit and receive side of the channel. To accomplish this, embodiments fill the lanes to the right of the end of a frame (marked by a SEP or SEPT), or the lanes to the right of the end of a UFC message (determined by calculating the total number of data blocks required to send the message), with idles. This results in the loss of bandwidth that could otherwise have been used to send data.

One embodiment deals with this tradeoff by defining a subset of transmitters and receivers called "Strictly Aligned Receivers." Strictly aligned receivers announce themselves as strictly aligned receivers to other modules, and obey the following rules in addition to the rules obeyed by all other transmitters and receivers: UFC headers can only appear in the least significant lane of a channel; data must be left aligned and contiguous; no data may follow a separator in a channel. Strictly aligned receivers can receive data only from transmitters obeying the strict alignment rules. Strictly aligned transmitters can transmit to both Strictly aligned receivers and non-strictly aligned receivers.

Although embodiments of the present invention have been described above with particularity, this was merely to teach one of ordinary skill in the art how to make and use the invention. Many additional modifications will fall within the scope of the invention, as that scope is defined by the following claims.

I claim:

1. A system for encoding data for transmission over a high-speed channel, said system comprising:
   a serializer to serialize combined synchronization information and data blocks for transmission over the high-speed channel;
   a gearbox to combine synchronization information with the data blocks to present to the serializer;
   a scrambler to scramble data blocks to present to the gearbox; and
   an encoding device storing a program, the program containing instructions to format the data blocks for sending frames of data over the high-speed channel,
   wherein the formatting reduces a number of operations used to receive the data blocks by a receiver by providing bytes of a stream of data in blocks comprising a predetermined number of bytes, wherein user flow control information is sent in one or more control headers in one or more blocks separate from the data blocks, and data is sent in full data blocks and one or more separator blocks, where a full data block of a frame of data comprises the predetermined number of bytes of data without a control header, and bytes of data of the frame of data which are less than the predetermined number of bytes are provided in one or more separator blocks for the frame of data, wherein, for each separator block of the one or more separator blocks, a separator control byte and a count of the bytes of data within the separator block if the count is less than a remaining number of bytes of the separator block is provided in the separator block.

2. The system of claim 1, wherein the program stored by the encoding device comprises instructions to
   transpose an order of data bytes received from a sending user application to present data blocks to the scrambler,
   wherein the transposing the order of data bytes enables data bytes to be recovered by a receiver free of performing shift operations to recover the data bytes.

3. The system of claim 1, wherein the program stored by the encoding device comprises instructions to detect a frame boundary free of data frame encapsulation by a pair of begin frame and end frame markers.

4. The system of claim 1, wherein the program stored by the encoding device comprises instructions to
   format user flow control data bytes received from a sending user application to present a user flow control header block followed by separate user flow control data blocks to the scrambler,
   wherein the separate user flow control data blocks enable user format data to be recovered by a receiver free of performing shift operations to recover user flow control format data bytes.

5. The system of claim 1, wherein the program stored by the encoding device comprises instructions to enforce the following rules when sending data to a receiver that self-announces as a strictly aligned receiver: (1) the data must be left aligned and contiguous; and (2) no bytes of the data may follow a separator in the high-speed channel.

6. The system of claim 1 wherein the serializer comprises:
a circuit configured to serialize parallel form data into serial form data and transmit the serial form data over the high-speed channel.

7. The system of claim 1 wherein the gearbox comprises:
a circuit configured to add synchronization information that indicates whether each data block contains user data information or control information.

8. The system of claim 1 wherein the scrambler comprises:
a circuit configured to scramble the data blocks according to a polynomial of $1+X^{39}+X^{58}$.

9. The system of claim 1 wherein the encoding device storing a program is implemented using a field programmable gate array (FPGA).

10. A system for receiving encoded data over a high-speed channel, said system comprising:
a de-serializer to de-serialize combined synchronization information and data blocks of frames of data transmitted over the high-speed channel;
a gearbox to strip synchronization information from the combined synchronization information and data blocks received from the de-serializer;
a de-scrambler to de-scramble data blocks received from the gearbox; and
a decoding device storing a program, the program containing instructions to receive data blocks sent over the high-speed channel,
wherein the receiving decodes the data blocks encoded by a transmitter to reduce a number of operations used to receive the data blocks by a receiver by decoding blocks of a stream of data, wherein the blocks comprise a predetermined number of bytes, and wherein user flow control information is in one or more control headers in one or more blocks separate from the data blocks, and data is in full data blocks and one or more separator blocks, where a full data block of a frame of data comprises the predetermined number of bytes of data without a control header, and bytes of data of the frame of data which are less than the predetermined number of bytes are provided in one or more separator blocks, wherein, for each separator block, a separator control byte and a count of the bytes of data within the separator block if the count is less than a remaining number of bytes of the separator block is provided in the separator block.

11. The system of claim 10 wherein the program stored by the decoding device comprises instructions to
receive data blocks from a sending user application that transpose an order of data bytes within the data blocks, wherein the transposing the order of data bytes enables data bytes to be recovered by the receiver free of performing shift operations.

12. The system of claim 10 wherein the program stored by the decoding device comprises instructions to
detect the separator block indicating a frame boundary in the data bytes received from a sending user application to present data blocks to the scrambler,
wherein the sending user application inserts the separator block for indicating the frame boundary of data bytes, thereby enabling the system to detect the frame boundary free of data frame encapsulation by a pair of begin frame and end frame markers.

13. The system of claim 10 wherein the program stored by the decoding device comprises instructions to
detect a user flow control header block followed by separate user flow control data blocks provided to the scrambler,
wherein a receiver separates the user flow control data bytes, thereby enabling user format data to be recovered free of performing shift operations to recover user flow control format data bytes.

14. The system of claim 10 wherein the program stored by the decoding device comprises instructions to
self-announce the system as a strictly aligned receiver, and enforce the following rules: (1) the data must be left aligned and contiguous; and (2) no bytes of the data may follow a separator in the high-speed channel.

15. The system of claim 10 wherein the de-serializer comprises:
a circuit configured to de-serialize serial form data into parallel form.

16. The system of claim 10 wherein the gearbox comprises:
a circuit configured to remove synchronization information that indicates whether each data block contains user data information or control information.

17. The system of claim 10 wherein the de-scrambler comprises:
a circuit configured to de-scramble the data blocks according to a polynomial of $1+X^{39}+X^{58}$.

18. The system of claim 10 wherein the decoding device storing a program is implemented using a field programmable gate array (FPGA).

19. A system for exchanging encoded data over a high-speed channel, said system comprising:
a sender to format data blocks for sending frames of serialized data over the high-speed channel,
wherein the formatting reduces a number of operations used to receive the data blocks by providing bytes of a stream of data in blocks comprising a predetermined number of bytes, wherein user flow control information is sent in one or more control headers in one or more blocks separate from the data blocks, and data is sent in full data blocks and one or more separator blocks, where a full data block of a frame of data of the frames of serialized data comprises the predetermined number of bytes of data without a control header, and bytes of data of the frame of data which are less than the predetermined number of bytes are provided in one or more separator blocks for the frame of data, wherein each separator block comprises a separator control byte and a count of the bytes of data transmitted in the separator block if the count is less than a remaining number of bytes of the separator block; and
a receiver to receive the data blocks sent in the frames of serialized data over the high-speed channel,
wherein the receiving decodes the data blocks encoded by the sender for reducing a number of operations used to receive the data blocks by the receiver by decoding each separator block.

* * * * *